US012592576B2

(12) United States Patent
Liu

(10) Patent No.: US 12,592,576 B2
(45) Date of Patent: Mar. 31, 2026

(54) POWER CONVERSION SYSTEM

(71) Applicant: DARFON ELECTRONICS CORP.,
Taoyuan City (TW)

(72) Inventor: Wei-Lin Liu, Taoyuan City (TW)

(73) Assignee: DARFON ELECTRONICS CORP.,
Taoyuan City (TW)

( * ) Notice: Subject to any disclaimer, the term of this
patent is extended or adjusted under 35
U.S.C. 154(b) by 638 days.

(21) Appl. No.: 18/128,202

(22) Filed: Mar. 29, 2023

(65) Prior Publication Data

US 2023/0327473 A1 Oct. 12, 2023

Related U.S. Application Data

(60) Provisional application No. 63/328,261, filed on Apr. 6, 2022.

(30) Foreign Application Priority Data

Jan. 31, 2023 (TW) ................................. 112103248

(51) Int. Cl.
| | |
|---|---|
| *H02J 7/00* | (2026.01) |
| *H02J 7/82* | (2026.01) |
| *H02J 7/96* | (2026.01) |
| *H02J 101/24* | (2026.01) |

(52) U.S. Cl.
CPC .... *H02J 7/96* (2026.01); *H02J 7/82* (2026.01);
*H02J 2101/24* (2026.01)

(58) Field of Classification Search
USPC ........................................................ 320/134
See application file for complete search history.

(56) References Cited

U.S. PATENT DOCUMENTS

| | | |
|---|---|---|
| 8,970,161 B1 | 3/2015 | Cuadros |
| 10,892,618 B1 | 1/2021 | Cooper |
| 2011/0043160 A1* | 2/2011 | Serban ...................... G05F 1/67 |
| | | 320/101 |
| 2017/0117716 A1 | 4/2017 | Wolter |
| 2019/0140449 A1 | 5/2019 | Faley |

FOREIGN PATENT DOCUMENTS

| | | |
|---|---|---|
| TW | M384409 U1 | 7/2010 |
| TW | 201342775 A | 10/2013 |

* cited by examiner

*Primary Examiner* — Samuel Berhanu
(74) *Attorney, Agent, or Firm* — Winston Hsu

(57) ABSTRACT

A power conversion system (PCS) is provided. A micro-control unit of the PCS obtains a current charged ratio of a rechargeable battery according to a state-of-charge (SOC) signal received from the rechargeable battery, and obtains an output power of the PCS according to the voltage and current detected by a voltmeter-and-current meter of the PCS. When the micro-control unit detects that the mains off-grid occurs, the following steps are performed: judging whether a current charged ratio of the rechargeable battery is greater than the first ratio; when it is determined that the current charged ratio is greater than the first ratio, judging whether the output power is less than a first power; and when it is judged that the output power is less than the first power, increasing a frequency of an alternating current output from an alternating current (AC) power port of the PCS, so that a photovoltaic (PV) inverter coupled to the AC power port stops outputting power.

8 Claims, 2 Drawing Sheets

POWER CONVERSION SYSTEM

BACKGROUND OF THE INVENTION

1. Field of the Invention

The present invention is related to a power conversion system (PCS), in particular to a power conversion system that can adjust the output AC frequency according to the charged ratio of a rechargeable battery.

2. Description of the Prior Art

Power conversion system (PCS) is a bidirectional power conversion inverter that can be used for on-grid and off-grid electrical power storage applications. How to operate a power conversion system efficiently has always been an important topic in this technical field.

SUMMARY OF THE INVENTION

A power conversion system of the present invention comprises an alternating current power port, a direct current power port, a voltmeter-and-current meter and a microcontroller unit. The direct current power port is coupled to a rechargeable battery. The voltmeter-and-current meter is coupled to the AC power port for detecting a voltage and a current output by the power conversion system from the AC power port. The microcontroller unit is for controlling an operation of the power conversion system and receiving a state-of-charge signal from the rechargeable battery. The microcontroller unit obtains a current charged ratio of the rechargeable battery according to the state of charge signal, and obtains the output power of the power conversion system according to the voltage and the current detected by the voltmeter-and-current meter. When the microcontroller unit detects an occurrence of mains off-grid, the microcontroller unit performs the following steps: determining whether the current charged ratio of the rechargeable battery is greater than a first predetermined ratio; when it is determined that the current charged ratio of the rechargeable battery is greater than the first predetermined ratio, determining whether the output power is less than a first predetermined power; and when it is determined that the output power is less than the first predetermined power, increasing a frequency of the alternating current output from the alternating current power port of the power conversion system, so that a photovoltaic inverter coupled to the AC power port stops outputting power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
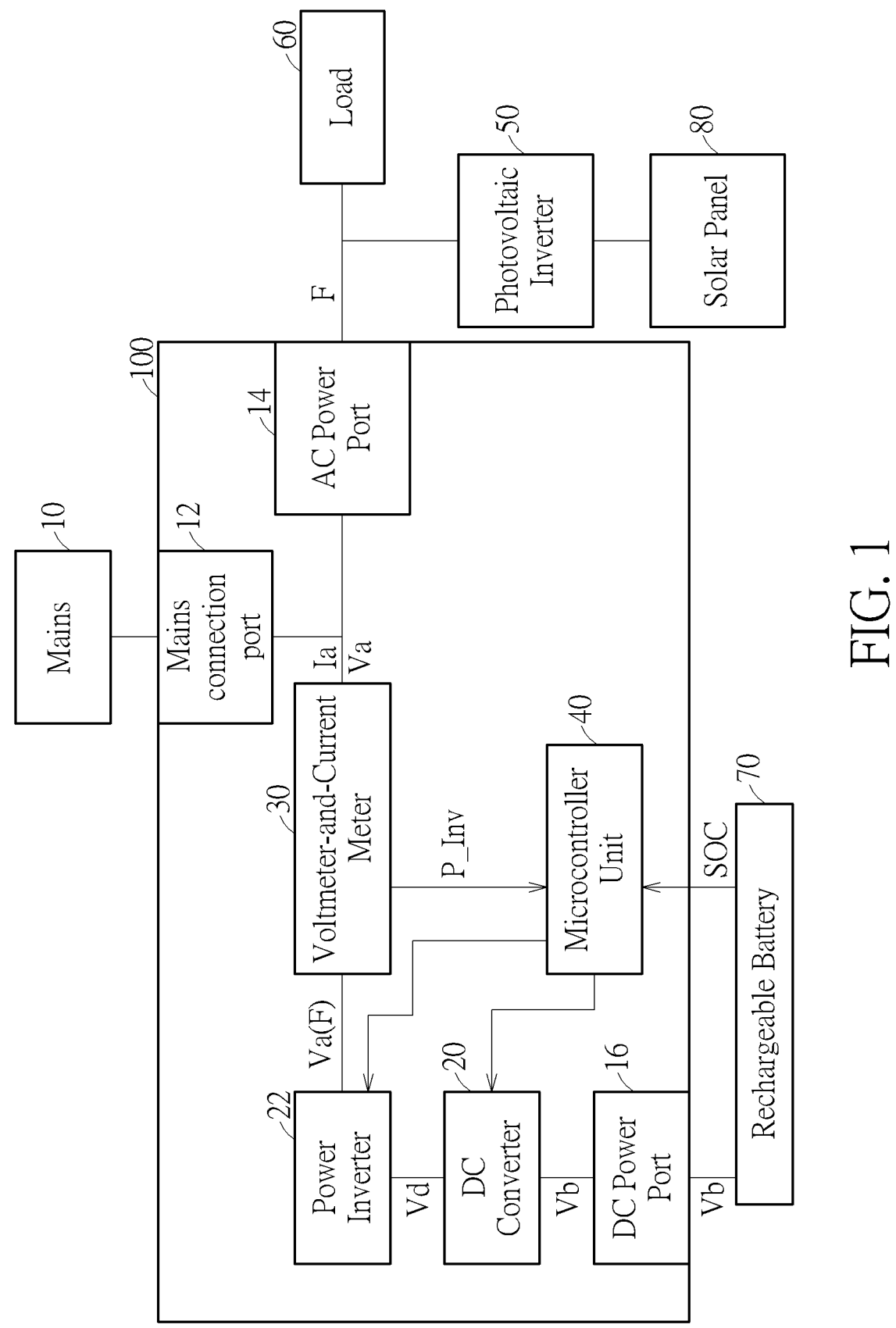
FIG. 1 is a functional block diagram of a power conversion system according to an embodiment of the present invention and the coupled mains, load, rechargeable battery, photovoltaic inverter, and solar panel.

FIG. 1 is a functional block diagram of a power conversion system (PCS) according to an embodiment of the present invention and the coupled mains 10, a load 60, a rechargeable battery 70, a photovoltaic inverter (PV inverter) 50, and a solar panel 80. The PV inverter 50 converts the direct current generated by the solar panel 80 into alternating current, and feed the converted alternating current into the load 60 and/or the power conversion system 100.

The power conversion system 100 includes a mains connection port 12, an AC power port 14, a DC power port 16, a voltmeter-and-current meter 30 and a microcontroller unit (MCU) 40. The power conversion system 100 can be connected to the mains 10 through the mains connection port 12 and receive power from the mains 10. The DC power port 16 is coupled to the rechargeable battery 7, and the power conversion system 100 can charge the rechargeable battery 70 through the DC power port 16 or receive power from the rechargeable battery 70. The voltmeter-and-current 30 is coupled to the AC power port 14 for detecting the voltage Va and current Ia output from the AC power port 14 by the power conversion system 100. Wherein, the voltage Va and the current Ia are the AC voltage and the AC current respectively. The MCU 40 controls the operation of the power conversion system and receives a state of charge signal SOC from the rechargeable battery 70. Wherein, the MCU 40 can obtain the current charged ratio of the rechargeable battery 70 according to the state of charge signal SOC, and obtain the output power P_Inv of the power conversion system 100 according to the voltage Va and current Ia detected by the voltmeter 30.

Wherein, when the output power P_Inv is positive, it means that the power conversion system 100 outputs power through the AC power port 14; and when the external output power P_Inv is negative, it means that the power conversion system 100 receives power from the outside through the AC power port 14.

The power conversion system 100 may further include a DC converter 20 and a power inverter 22. The DC converter 20 converts the DC voltage Vb output by the rechargeable battery 70 into a DC voltage Vd with different values, and the power inverter 22 converts the DC voltage Vd into an AC voltage Va.

Figure 2:
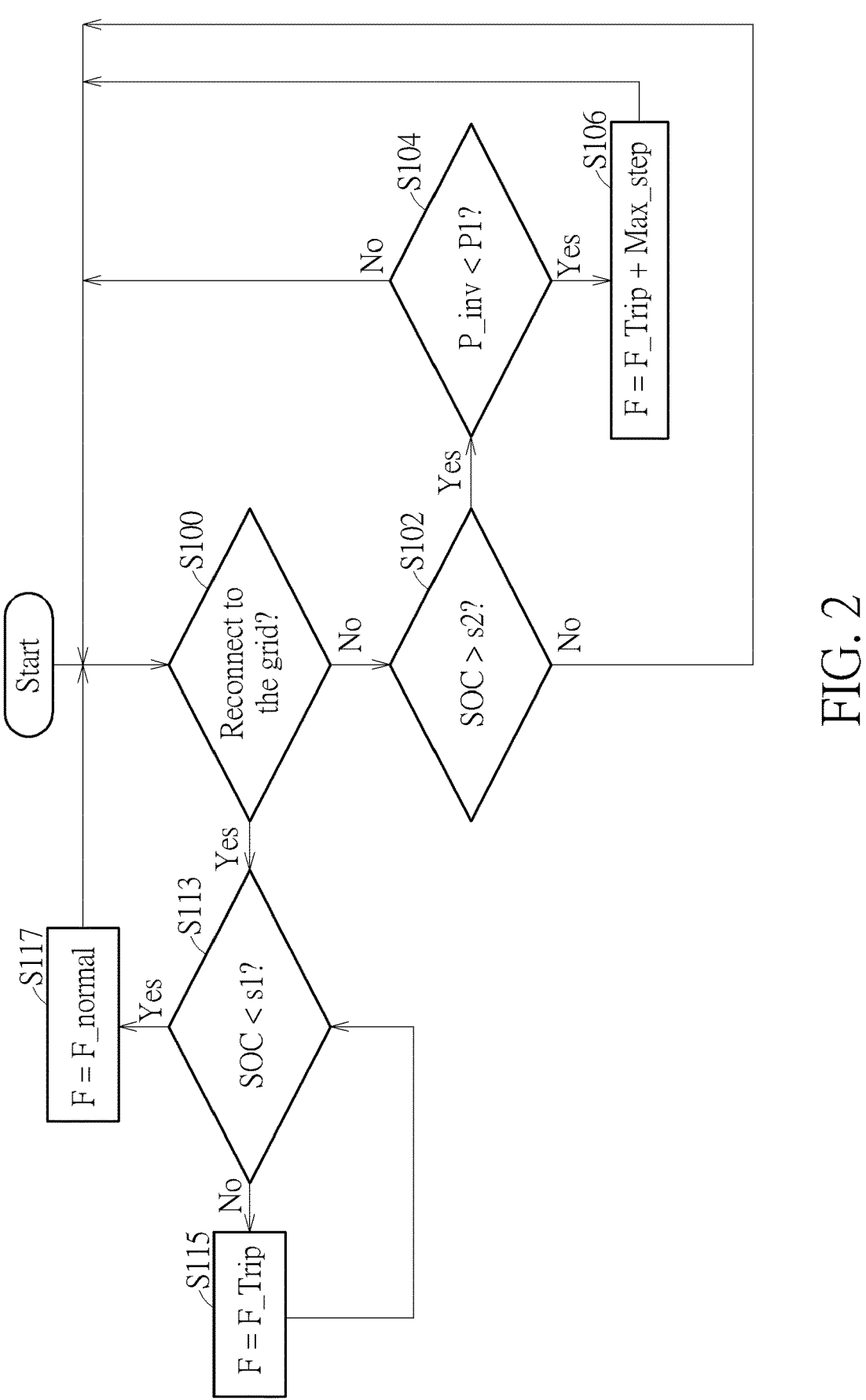
FIG. 2 is a flowchart of the microcontroller unit in FIG. 1 controlling the power conversion system.

FIG. 2 is a flowchart of controlling the power conversion system 100 by the MCU 40 in FIG. 1. When the microcontroller unit 40 detects that the mains off-grid (for example: when the connection between the connection port 12 and the mains 10 is cut off or the mains 10 is powered off), the microcontroller unit 40 will execute the process of FIG. 2, and this process includes the following steps:

Step S100: the microcontroller unit 40 determines whether the power conversion system 100 is reconnected to the grid, wherein when the conversion system 100 is reconnected to the mains 10 or the photovoltaic inverter 50 starts to supply power, it means that the power conversion system 100 is reconnected to the grid. When the microcontroller unit 40 determines that the power conversion system 100 has not been connected to the grid again, execute step S102; otherwise, execute step S113;

Step S102: the microcontroller unit 40 determines whether the current charged ratio of the rechargeable battery 70 is greater than a predetermined ratio S2 according to the state-of-charge signal SOC, wherein the predetermined ratio S2 (for example, between 20% and 90%), and when the microcontroller unit 40 determines that the current charged ratio of the rechargeable battery 70 is greater than the predetermined ratio S2, execute step S104; otherwise, return to step S100;

Step S104: the microcontroller unit 40 determines whether the output power P_Inv is less than the preset power P1, wherein the predetermined power P1 (for example, 500 watts) can be adjusted according to different control requirements. When the microcontroller unit 40 determines that the output power P_Inv is less than the predetermined power P1, execute step S106; otherwise, return to step S100;

Step S106: the microcontroller unit 40 increases the frequency F of the AC power output by the power conversion system 100 from the AC power port 14, so that the photovoltaic inverter 50 coupled to the AC power port 14 stops outputting power and enters into over-frequency protection. For example: the microcontroller unit 40 increases the frequency F of the alternating current to (F_Trip+Max_step), wherein F_Trip is, for example, 60.6 hertz (Hz), and Max_step is, for example, 0.3 Hz. Furthermore, once the frequency F of the alternating current reaches above F_Trip, the photovoltaic inverter 50 will stop outputting power, and the frequency F_trip may be called a cut-off frequency. Therefore, when the frequency F of the alternating current is equal to (F_Trip+Max_step), it is more guaranteed that the photovoltaic inverter 50 will stop outputting power; when the microcontroller unit 40 completes step S106, it returns to step S100;

Step S113: the microcontroller unit 40 determines whether the current charged ratio of the rechargeable battery 70 is less than a predetermined ratio S1 according to the state-of-charge signal SOC, wherein the predetermined ratio S1 can be 10% less than the predetermined ratio S2, so when the predetermined ratio S2 is between 20% and 90%, the predetermined ratio S1 can be between 10% and 80%; if the microcontroller unit 40 determines the current charged ratio of the rechargeable battery 70 is not less than the predetermined ratio S1, execute step S115; otherwise, execute step S117;

Step S115: the microcontroller unit 40 sets the frequency F of the AC output from the AC power port 14 of the power conversion system 100 to the cut-off frequency F_trip, so that the photovoltaic inverter 50 stops outputting power and enters into over-frequency protection; and Step S117: the microcontroller unit 40 sets the frequency F of the AC output from the AC power supply port 14 of the power conversion system 100 to a general frequency F_normal, so that the photovoltaic inverter 50 can resume outputting power; wherein the general frequency F_normal is, for example, 60 Hz; after the microcontroller unit 40 executes the step S117, return to the step S100.

When the photovoltaic inverter 50 detects that the voltage or frequency exceeds the normal operating range, it will start protection (for example: overvoltage, under voltage, over frequency, under frequency, islanding . . . etc.), and then no longer output power and feed grid, at this time, the microcontroller unit 40 will judge whether the photovoltaic inverter 50 has tripped, and adjust the AC output frequency of the power conversion system 100 according to the state to determine whether the photovoltaic inverter 50 can be reconnected and fed into the grid. If the photovoltaic inverter 50 detects that the voltage and frequency of the mains terminal meet the normal operating range, it will determine that the condition for reconnecting to the grid is met, and the photovoltaic inverter 50 counts a specific number of seconds (for example: 300 seconds as specified by grid-connected regulations) will be fed into the grid output.

In the present invention, the photovoltaic inverter 50 responds to the frequency F of the AC output from the AC power port 14 in two stages: full output (100%) or no output (0%). For example, when the frequency F of the AC output from the AC power supply port 14 is between 59.3 Hz and 60.5 Hz, the photovoltaic inverter 50 will convert the power received from the solar panel 80, and then output the converted power 100%; and when the frequency of the AC power output by the AC power port 14 is less than 59.3 Hz or greater than 60.5 Hz, the photovoltaic inverter 50 stops outputting power.

According to the above-mentioned flow in FIG. 2, when the microcontroller unit 40 detects that the mains is disconnected from the grid, and determines that the current charged ratio of the rechargeable battery 70 is greater than the predetermined ratio S2 and the output power P_Inv is smaller than the predetermined power P1, It will make the microcontroller unit 40 increase the frequency F of the alternating current output by the power conversion system 100 from the alternating current power supply port 14, so that the photovoltaic inverter 50 stops outputting power and enters the over-frequency protection, and the power conversion system 100 provides the power of the rechargeable battery 70 to the load 60 so that the energy of the load 60 is not interrupted. At this time, the value of the output power P_Inv of the power conversion system 100 is a positive number.

Furthermore, when the microcontroller unit 40 detects that the mains is off-grid, and the microcontroller unit 40 judges that the current charged ratio of the rechargeable battery 70 is equal to or less than the predetermined ratio S2, the microcontroller unit 40 maintains the frequency F of the alternating current output from the alternating current power port 14, so that the photovoltaic inverter 50 can continue to output electric energy.

In addition, when the microcontroller unit 40 determines that the current charged ratio of the rechargeable battery 70 is less than the predetermined ratio S1, the microcontroller unit 40 reduces the frequency F of the AC output from the AC power port 14, so that the photovoltaic inverter 50 restore output power. At this time, if the power consumption of the load 60 is greater than the output power of the photovoltaic inverter 50, the power conversion system 100 will transfer the power from the rechargeable battery 70 to the load 60. However, if the output power of the photovoltaic inverter 50 is greater than the power consumption of the load 60 at this time, the photovoltaic inverter 50 will also output power to the power conversion system 100 to charge the rechargeable battery 70.

In addition, when the microcontroller unit 40 determines that the current charged ratio of the rechargeable battery 70 is between the predetermined ratio S2 and the predetermined ratio S1, the microcontroller unit 40 will set the frequency F of the AC power output from the AC power port 14 as the cut-off frequency F_trip, so that the photovoltaic inverter 50 stops outputting power and enters into over-frequency protection.

When the microcontroller unit 40 of the present invention detects that the mains off the grid, it will make the power conversion system 100 output the AC frequency F, and then induce the photovoltaic inverter 50 to not enter the islanding protection and can generate electricity and feed the grid, its energy can be supplied to the load 60 and the power conversion system 100, and the microcontroller unit 40 dynamically adjusts the frequency of the alternating current output by the power conversion system 100 according to the current charged ratio of the rechargeable battery 70 and the positive or negative magnitude of the output power P_Inv, thus the overall power flow can be efficiently regulated.

The above descriptions are only preferred embodiments of the present invention, and all equivalent changes and modifications made according to the scope of the patent application of the present invention shall fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

DESCRIPTION OF REFERENCE NUMERALS

10: Mains
12: Mains connection port
14: AC Power Port
16: DC Power Port
20: DC Converter
22: Power Inverter
30: Voltmeter-and-Current Meter
40: Microcontroller Unit
50: Photovoltaic Inverter
60: Load
70: Rechargeable Battery
80: Solar Panel
100: Power Conversion System
F: Frequency
Ia: Current
P_Inv: Output Power
Va: Voltage
Vb: DC Voltage
Vd: DC Voltage
SOC: State of Charge Signal
S100, S102, S104, S106, S113, S115, S117: Steps

What is claimed is:

1. A power conversion system (PCS) comprising:
an alternating current (AC) power port;
a direct current (DC) power port coupled to a rechargeable battery;
a voltmeter-and-current meter coupled to the AC power port for detecting a voltage and a current output by the power conversion system from the AC power port; and
a microcontroller unit (MCU) for controlling an operation of the power conversion system and receiving a state-of-charge (SOC) signal from the rechargeable battery;
wherein the microcontroller unit obtains a current charged ratio of the rechargeable battery according to the state of charge signal, and obtains the output power of the power conversion system according to the voltage and the current detected by the voltmeter-and-current meter; and
wherein when the microcontroller unit detects an occurrence of mains off-grid, the microcontroller unit performs the following steps:
determining whether the current charged ratio of the rechargeable battery is greater than a first predetermined ratio;
when it is determined that the current charged ratio of the rechargeable battery is greater than the first predetermined ratio, judging whether the output power is less than a first predetermined power; and when it is determined that the output power is less than the first predetermined power, increasing a frequency of the alternating current output from the alternating current power port of the PCS, so that a photovoltaic (PV) inverter coupled to the AC power port stops outputting power.

2. The power conversion system of claim 1, wherein when the microcontroller unit detects the mains off-grid, and when it is determined that the current charged ratio of the rechargeable battery is greater than the first predetermined ratio and the output power is smaller than the first predetermined power, the power conversion system provides the electric power from the rechargeable battery to a load.

3. The power conversion system of claim 1, wherein when the microcontroller unit detects that the mains off-grid, and the microcontroller unit determines that the current charged ratio of the rechargeable battery is equal to or less than the first predetermined ratio, the microcontroller unit maintains the frequency of the alternating current output from the alternating current power port, so that the photovoltaic inverter continues to output power.

4. The power conversion system of claim 1, wherein when the microcontroller unit detects that the mains off-grid, and determines that the current charged ratio of the rechargeable battery is greater than the first predetermined ratio and the output power is greater than or equal to the first predetermined power, the microcontroller unit maintains the frequency of the alternating current output from the alternating current power port, so that the photovoltaic inverter continues to output power.

5. The power conversion system of claim 1, wherein when the microcontroller unit determines that the current charged ratio of the rechargeable battery is less than a second predetermined ratio, the microcontroller unit reduces the frequency of the alternating current output by the alternating current power supply port, so that the photovoltaic inverter restores the output power, and the second predetermined ratio is smaller than the first predetermined ratio.

6. The power conversion system of claim 5, wherein when the microcontroller unit determines that the current charged ratio of the rechargeable battery is less than the second predetermined ratio, the photovoltaic inverter resumes output power to a load, and when the power consumption of the load is greater than the output power of the photovoltaic inverter, the power conversion system outputs electrical power to the load.

7. The power conversion system of claim 5, wherein when the microcontroller unit determines that the current charged ratio of the rechargeable battery is less than the second predetermined ratio, the photovoltaic inverter resumes output power to a load, and when the output power of the photovoltaic inverter is greater than the power consumption of the load, the photovoltaic inverter outputs electric power to the power conversion system to charge the rechargeable battery.

8. The power conversion system of claim 1, wherein when the microcontroller unit determines that the current charged ratio of the rechargeable battery is between the first predetermined ratio and a second predetermined ratio, the microcontroller unit sets the frequency of the alternating current output from the alternating current power port as a cut-off frequency, so that the photovoltaic inverter stops outputting power, and the second predetermined ratio is smaller than the first predetermined ratio.

* * * * *